US012641659B2

(12) United States Patent
Joppich-Dohlus et al.

(10) Patent No.: US 12,641,659 B2
(45) Date of Patent: May 26, 2026

(54) METHOD FOR OPERATING A RADIO NODE, AND RADIO NODE

(71) Applicant: Diehl Metering Systems GmbH, Nuremberg (DE)

(72) Inventors: Petra Joppich-Dohlus, Rathsberg (DE); Achim Schmidt, Weissenohe (DE); Thomas Blank, Merkendorf (DE)

(73) Assignee: Diehl Metering Systems GmbH, Nüremberg (DE)

( * ) Notice: Subject to any disclaimer, the term of this patent is extended or adjusted under 35 U.S.C. 154(b) by 274 days.

(21) Appl. No.: 18/517,302

(22) Filed: Nov. 22, 2023

(65) Prior Publication Data

US 2024/0188156 A1     Jun. 6, 2024

(30) Foreign Application Priority Data

Dec. 6, 2022    (DE) ..................... 10 2022 132 419.2

(51) Int. Cl.
   *H04W 76/15*        (2018.01)
   *H04W 48/02*        (2009.01)
   (Continued)

(52) U.S. Cl.
   CPC ........... *H04W 76/15* (2018.02); *H04W 48/02* (2013.01); *H04W 48/16* (2013.01); *H04W 88/085* (2013.01)

(58) Field of Classification Search
   CPC ..... H04W 76/15; H04W 48/02; H04W 48/16; H04W 88/085; H04W 12/00; H04W 4/50; H04W 84/18; H04W 12/06; H04W 4/38;

H04W 12/084; H04W 12/61; H04L 67/12; H04L 63/08; H04Q 2209/60; H04Q 2209/88; H04Q 9/00
See application file for complete search history.

(56) References Cited

U.S. PATENT DOCUMENTS 9,494,480 B2    11/2016  Klicpera
2013/0106616 A1*  5/2013  Gustafsson .............. H04Q 9/00
                                          340/870.02
(Continued)

FOREIGN PATENT DOCUMENTS

CN        113596095  A    11/2021
DE        10133367  A1    1/2003
EP        3930291  A1    12/2021

*Primary Examiner* — Thai Nguyen
(74) *Attorney, Agent, or Firm* — Laurence A. Greenberg; Werner H. Stemer; Ralph E. Locher

(57) ABSTRACT

A method for operating a radio node, radio sensor node recording consumption or radio actuator node performing work in a fixed network, includes providing a first primary communication link between a radio node and a base station of the network, for access operation from or through the base station to the radio node and a second primary communication link between the radio node and a mobile data transceiver station, for access operation from or through the mobile data transceiver station to the radio node. The radio nodes are managed in a head end communicating with the base station or the mobile data transceiver station through a tertiary communication link. Access operation occurs from the mobile data transceiver station or head end, through the mobile data transceiver station, to a radio node using access data based on a token and digital twin combination of the operating data of the radio node.

20 Claims, 7 Drawing Sheets

(51) Int. Cl.
     H04W 48/16      (2009.01)
     H04W 88/08      (2009.01)

(56)           References Cited

U.S. PATENT DOCUMENTS

2016/0080837 A1*  3/2016  Cornwall ................. G01S 5/14
                                         340/870.02
2020/0112914 A1*  4/2020  Petkov ............. H04W 52/0229
2024/0039910 A1*  2/2024  Falk ................... H04W 12/084

* cited by examiner

| Radio node 1 | Radio node 2 | ...... | Radio node 1 +n |
|---|---|---|---|
| Token 1 | Token 2 | ...... | Token 1+n |
| Digital twin 1 | Digital twin 2 | ...... | Digital twin 1+ n |
| ...... | ...... | ...... | ...... |

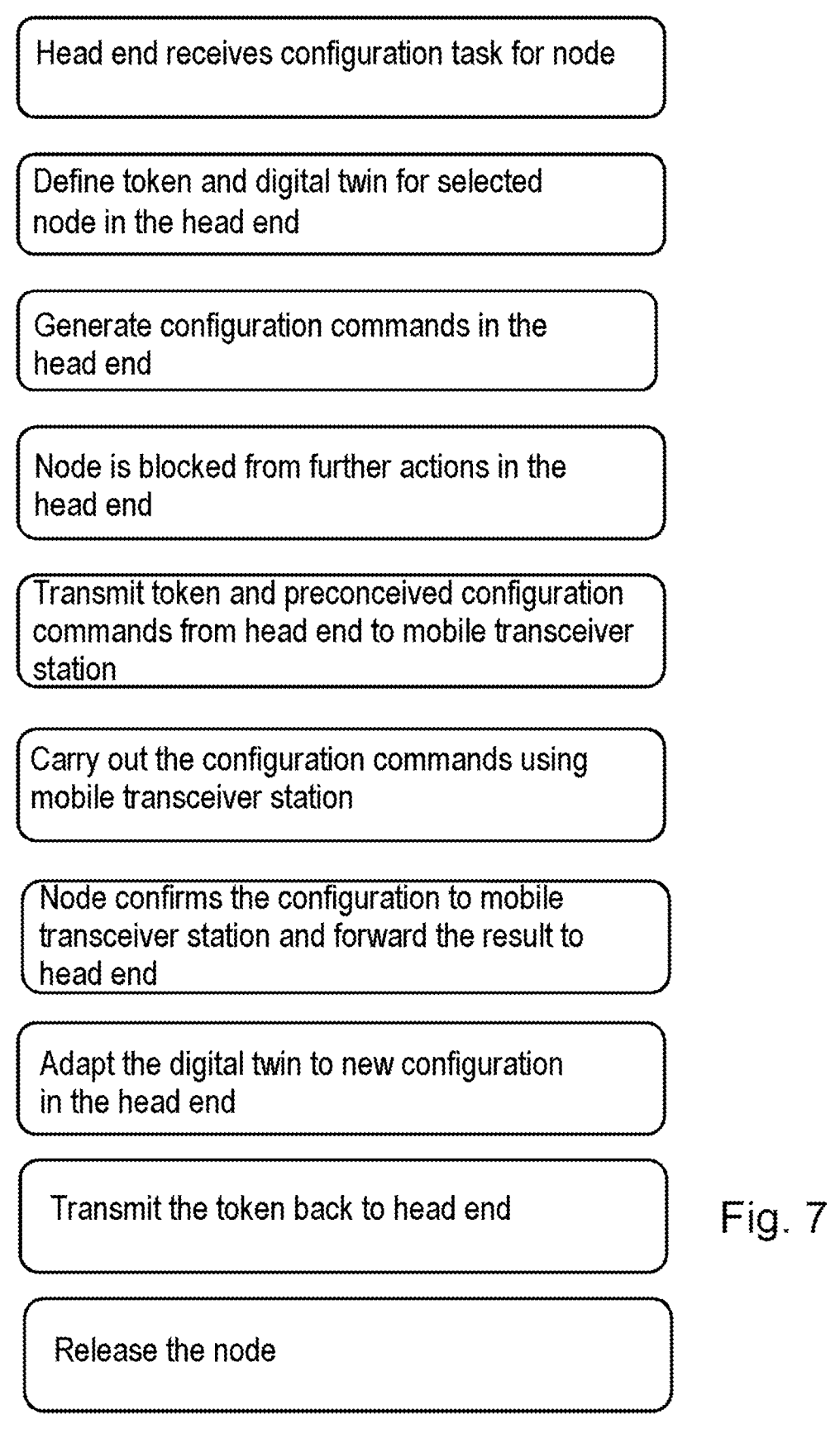

Head end receives configuration task for node

Define token and digital twin for selected node in the head end

Generate configuration commands in the head end

Node is blocked from further actions in the head end

Transmit token and preconceived configuration commands from head end to mobile transceiver station Carry out the configuration commands using mobile transceiver station Node confirms the configuration to mobile transceiver station and forward the result to head end Adapt the digital twin to new configuration in the head end Transmit the token back to head end Release the node

Fig. 7

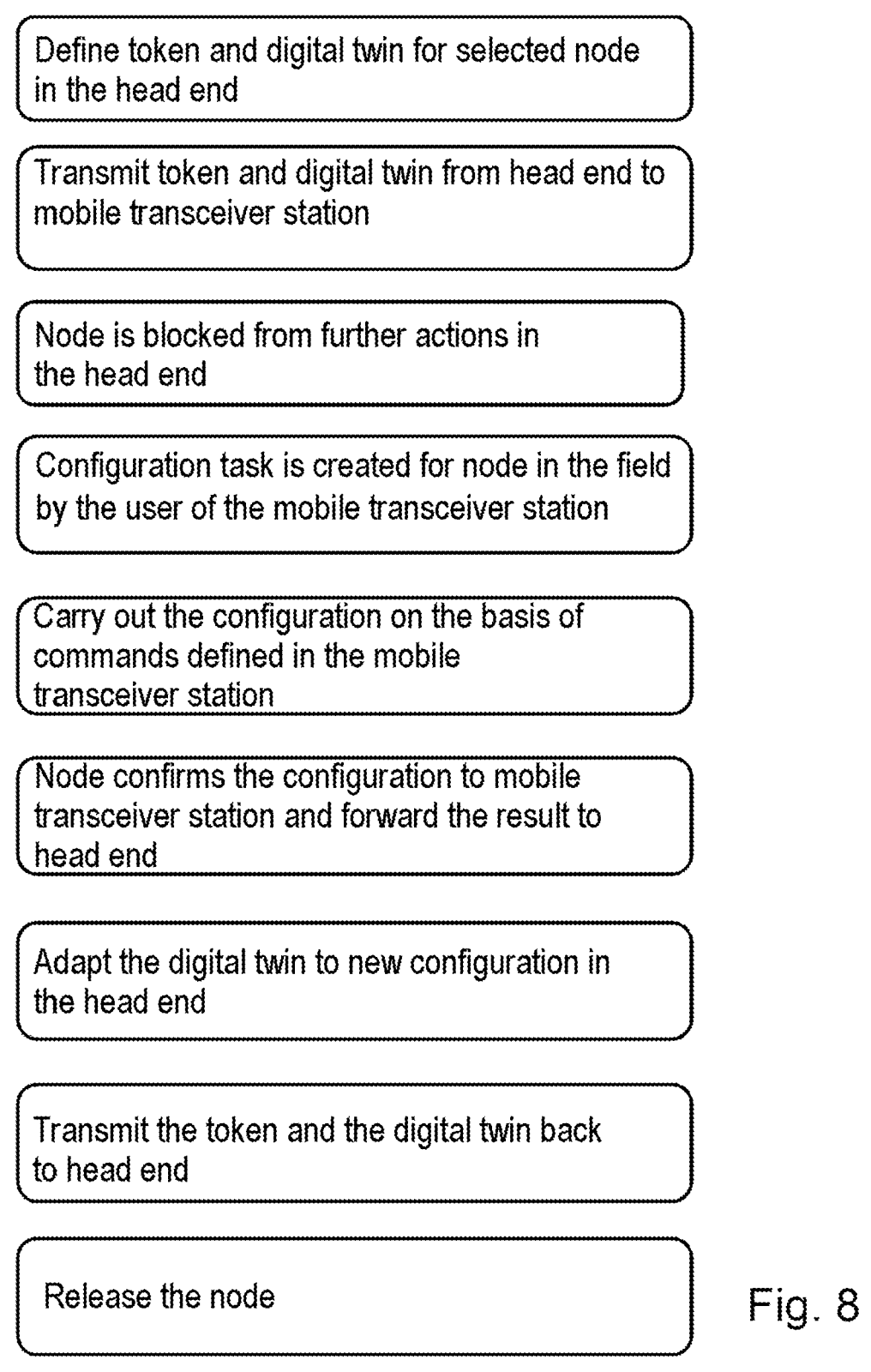

Define token and digital twin for selected node in the head end

Transmit token and digital twin from head end to mobile transceiver station

Node is blocked from further actions in the head end

Configuration task is created for node in the field by the user of the mobile transceiver station Carry out the configuration on the basis of commands defined in the mobile transceiver station Node confirms the configuration to mobile transceiver station and forward the result to head end Adapt the digital twin to new configuration in the head end Transmit the token and the digital twin back to head end Release the node

Fig. 8

METHOD FOR OPERATING A RADIO NODE, AND RADIO NODE

CROSS-REFERENCE TO RELATED APPLICATION

This application claims the priority, under 35 U.S.C. § 119, of German Patent Application DE 10 2022 132 419.2, filed Dec. 6, 2022; the prior application is herewith incorporated by reference in its entirety.

FIELD AND BACKGROUND OF THE INVENTION

The present invention relates, first of all, to a method for operating a radio node, preferably a radio sensor node for recording consumption and/or a radio actuator node for performing work, in a fixed network including a plurality of radio nodes. The invention relates, second of all, to a radio node, in particular a radio sensor node for recording consumption and/or a radio actuator node for performing work.

The radio node represents one radio node from a plurality of radio nodes of a fixed network. The radio node has its own battery, in particular a long-life battery, that supplies energy thereto autonomously in the fixed network. In order to preserve the battery, the radio nodes are usually in a sleep mode and transmit data to a fixed base station at certain times and dates in a wake-up mode. For this purpose, temporal access windows are defined for the base station for the purpose of reading data from the radio node and for the purpose of transmitting commands to the radio node (for example configuration commands). The access operations preferably run in automated fashion therein. The transmission in the radio system is preferably bidirectional. The radio nodes of the fixed network may communicate only with the fixed base stations or, if necessary, with one another as well. According to the starting point of the present invention, the radio nodes of the fixed network should be able to be influenced not only by fixed base stations, but also by mobile data transceiver stations or "data transceiver station". A mobile data transceiver station is a communication unit that is located on a vehicle or carried or worn by a person, and thereby enables mobile reading or configuration. Access operations to individual radio nodes, for example to configure them or to adapt their configuration, through base stations and also through mobile data transceiver stations, may potentially be carried out simultaneously, since it may be the case that a user of the fixed network and also a network-automated mechanism wish to influence a certain radio node simultaneously. However, the communication bandwidths and access windows may in some cases be severely limited, making it difficult to negotiate communication and to use configuration data. Uncoordinated access may lead to communication errors, incorrect configurations and to loss of data integrity in the node.

DESCRIPTION OF THE RELATED ART

German Patent Application DE 101 33 367 A1 describes a consumption meter that uses different types of radio telegrams for the transmission of radio telegrams to a fixed receiver and to a mobile receiver. That method is for the unidirectional transmission of data from a consumption meter to a receiver.

U.S. Publication No. 2016/0080837 A1 describes a method for the bidirectional communication of individual endpoints, for example consumption meters of an AMR network, with a data collector, which may be either fixed or mobile. The method makes reference to measures for locating an "endpoint of interest."

European Patent Application EP 3 930 291 A1 relates to a data processing device having a LoRa communication module for receiving measurement data. Access tokens are used to remove or add sensor units from or to the network.

U.S. Pat. No. 9,494,480 B2 relates to a water parameter usage and monitoring device by way of which the water quality of a water supply network is able to be monitored. Among other things, token authorization may also be provided to set up access to the device.

SUMMARY OF THE INVENTION

It is accordingly an object of the invention to provide a method for operating a radio node, and a radio node, which overcome the hereinafore-mentioned disadvantages of the heretofore-known methods and nodes of this general type and which enable more reliable configurability of radio nodes in a fixed network that is also able to be read on a mobile basis and also able to be configured on a mobile basis.

With the foregoing and other objects in view there is provided, in accordance with the invention, a method for operating a radio node, preferably a radio sensor node for recording consumption and/or a radio actuator node for performing work, in a fixed network including a plurality of radio nodes, wherein:

provision is made for a first, preferably bidirectional primary communication link between a radio node and a base station of the fixed network, through which an access operation, in particular a configuration access operation, is able to be carried out from the base station or through the base station to the radio node, provision is made for a second, preferably bidirectional primary communication link between the radio node and a mobile data transceiver station, through which an access operation, in particular a configuration access operation, is able to be carried out from the mobile data transceiver station or through the mobile data transceiver station to the radio node, provision is made for a head end in which the radio nodes are managed, the head end is able to communicate with the base station of the fixed network and/or with the mobile data transceiver station through a tertiary communication link, and an access operation, in particular a configuration access operation, takes place from the mobile data transceiver station or from the head end, through the mobile data transceiver station, to one radio node from the plurality of radio nodes of the fixed network by way of access data based on the combination of a preferably radio node-specific token or access deposit and a digital twin of the operating data, preferably of the configuration data of the radio node in question.

Expedient embodiments of the invention are recited in the dependent claims.

The invention allows a user, for example in the event of problems in the fixed network, to still be able to carry out a configuration on a node by performing this, instead of in the fixed network, during a mobile tour using a mobile data transceiver station. According to the invention, only a single influencing access operation to a radio node is thus possible in a certain time window. Due to the combination of the radio node-specific token and the digital twin, communication errors, incorrect configurations or loss of data integrity caused by unsynchronized access operations are able to be effectively avoided. The digital twin is a replica of the radio node configuration, that is to say of the radio node attributes, at a specific time.

Preferably, a token and a digital twin are each managed or formed in the head end for the respective nodes of the fixed network. Node, token and digital twin may thereby be assigned uniquely to one another.

For an access operation using the mobile data transceiver station, the token, in the form of an electronic access deposit, may be transmitted from the head end to the selected mobile data transceiver station as part of the access data, enabling the mobile data transceiver station to access the node. Preferably, the node is blocked in this case from performing further actions in the head end. Access to the node in question may thereby be synchronized as needed.

The token may in this case include for example an electronic access key of the respective radio node or be formed thereby.

As operating data, the digital twin of the respective radio node may in particular include the ID data, and/or the radio parameters, in particular the transmission scheme, and/or the configuration of the frame content, and/or the alarm profile, and/or the configuration of the log files. The digital twin is thus limited to these data. This in turn means that the configuration process is able to be performed more easily.

Following or at the same time as the configuration of the node, the digital twin is adapted accordingly, that is to say synchronized. The relevant changes to the operating data or configuration data are accordingly transferred to the digital twin. This may be carried out either by the mobile data transceiver station or by the head end. Since the accessing entity, for example the mobile data transceiver station, thus possesses a digital twin, that is to say a copy of the configuration data or attribute data of the node, it is not necessary for the node to have to be read completely before the configuration is changed. This makes it considerably easier to change operating data, preferably configuration data, for the large number of radio nodes present in a fixed network.

For the access operation, the digital twin may also be transmitted from the head end to the accessing mobile data transceiver station with the token.

After the node has been accessed or configured, the access data, in the form of the token or the digital twin and the token, may be transmitted back from the accessing mobile data transceiver station to the head end. After the access data have been received by the head end, access to the radio node may thus be released again. After they have been returned, the access data are released again.

Should return transmission not be able to be performed, the access data, in the form of the token or the digital twin and the token, may also be forcibly released again on the respective node. In this case, the digital twin has to be recreated or resynchronized and read by the radio node.

According to one expedient embodiment, the token may have a time-limited validity, that is to say have an effective expiration date.

Access to the node may be assigned by the head end to the mobile data transceiver station, in particular in the course of a work task, or be requested by the mobile data transceiver station from the head end.

As soon as access data for the radio nodes in question have been created, the radio nodes in question are blocked from other access operations in the central unit.

In order to control access, the access data may include preconceived commands or be formed thereby. In the case of preconceived commands, the digital twin may remain in the head end. The node is configured in this case based on the preconceived commands. The same applies with regard to the update or synchronization, which takes place as part of the configuration, of the digital twin remaining in the head end.

According to one particular embodiment, the token may also be implemented as a marker in the digital twin.

According to one expedient embodiment of the invention, the token and/or the digital twin of the operating data of the radio node in question may also be used when accessing, for example configuring the radio node in question, through the fixed network or through the base station thereof. As long as the token and/or the digital twin of the radio node in question is being used by the fixed network or the base station thereof, a configuration task is not possible for the mobile system.

Within the scope of the invention, LoRaWAN is preferably implemented as fixed network.

A wireless M-bus communication is preferably implemented between the radio node and the mobile data transceiver station.

A preferably automated time window-based bidirectional data exchange preferably takes place in the fixed network during normal operation.

With the objects of the invention in view, there is concomitantly provided a radio node, in particular a radio sensor node for recording consumption and/or a radio actuator node for performing work, comprising:

a housing, a first transceiver for bidirectional communication along a first, preferably bidirectional primary communication link, a second transceiver for bidirectional communication along a second, preferably bidirectional primary communication link, a sensor and/or actuator device, a battery, preferably a long-life battery, and a microprocessor having an electronic control and regulation device, the electronic control and regulation device being configured to carry out the method according to the invention.

Other features which are considered as characteristic for the invention are set forth in the appended claims.

Although the invention is illustrated and described herein as embodied in a method for operating a radio node, and a radio node, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 7 is a flowchart of a first example of individual steps when configuring a radio node of a fixed network according to FIG. 1 through the mobile data transceiver station; and FIG. 8 is a second example of a flowchart when configuring a radio node of a fixed network according to FIG. 1 through the mobile data transceiver station.

DETAILED DESCRIPTION OF THE INVENTION

Figure 1:
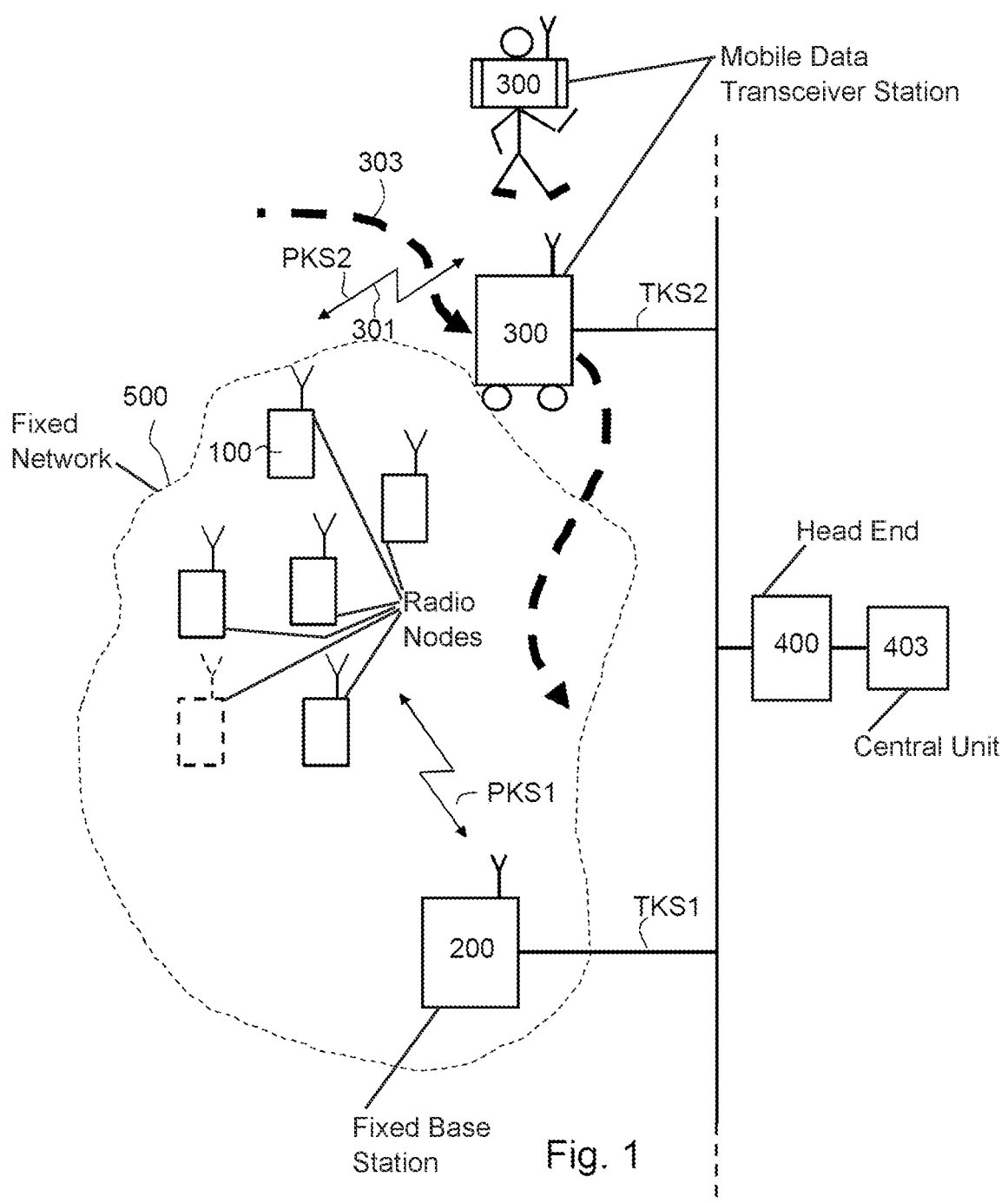
FIG. 1 is a roughly simplified schematic block diagram of one example of a fixed network and of a mobile data transceiver station by way of which the individual radio nodes of the fixed network are able to be accessed.

Referring now to the figures of the drawings in detail and first, particularly, to FIG. 1 thereof, there is seen a plurality of individual radio nodes 100, which are combined in a so-called fixed network 500. The radio nodes 100 of the fixed network 500 are able to communicate bidirectionally with at least one fixed base station 200 along a first primary communication measurement link PKS1. The base station 200 is in turn connected to a head end 400 through a first tertiary communication link TKS1. The head end 400 is intended to manage the data (for example operating data, consumption data, user data, etc.) in relation to the individual radio nodes 100. The head end 400 may be connected to a central unit 403. The central unit 403 has a database 401 as central storage unit according to FIG. 3. The database 401 may also be a so-called cloud storage unit. The head end 400 and the central unit 403 serve to manage the individual radio nodes 100 of the fixed network 500 and to further process data transmitted by the individual radio nodes 100.

The radio node 100 may preferably be a radio sensor node for recording consumption (such as for example water consumption, gas consumption, electricity consumption) and/or a radio actuator node for performing work. Of course, the radio node 100 may also contain both functionalities in one.

During normal operation, the fixed network 500 is read by the respective base station 200 through the first primary communication link PKS1 or configuration tasks are carried out on the individual radio nodes 100 through the respective base station 200 of the fixed network 500.

In the method according to the invention, provision is made to additionally read and configure the fixed network 500 by way of a mobile data transceiver station 300. This may be for example a vehicle that moves along a certain route 303, and bidirectional data transmission takes place between the mobile data transceiver station 300 and the respective radio node 100 through a second primary communication link PKS2.

Unlicensed frequency ranges F are preferably provided for the first and second communication links PKS1 and PKS2. The first primary communication link PKS1 preferably involves LoRaWAN. The second primary communication link PKS2 preferably involves Wireless M-Bus. Frequencies from the frequency distribution and band usage of the 868 MHz band may preferably be considered for the first primary communication link PKS1 and/or the second primary communication link PKS2.

Instead of a vehicle, the mobile data transceiver station 300 may also be implemented in the form of a data processing unit, such as for example a notebook, a hand-held device or a smartphone, which is carried by a passer-by in order to read the fixed network 500.

The base station 200 of the fixed network 500 is connected to the head end 400 over a first tertiary communication link TKS1. By way of example, the base station 200 may be configured in this case as a gateway that is connected to the head end 400 over the Internet through a server (not illustrated in the figures).

It is likewise possible to connect the mobile data transceiver station 300 to the head end 400 over a second tertiary communication link TKS2. The second tertiary communication link TKS2 may for example involve WLAN, Bluetooth® or a mobile radio link.

By way of example, the fixed network 500 is operated by a municipal utility company. The radio nodes 100 in question are stationary in the private or commercial infrastructure.

Figure 2:
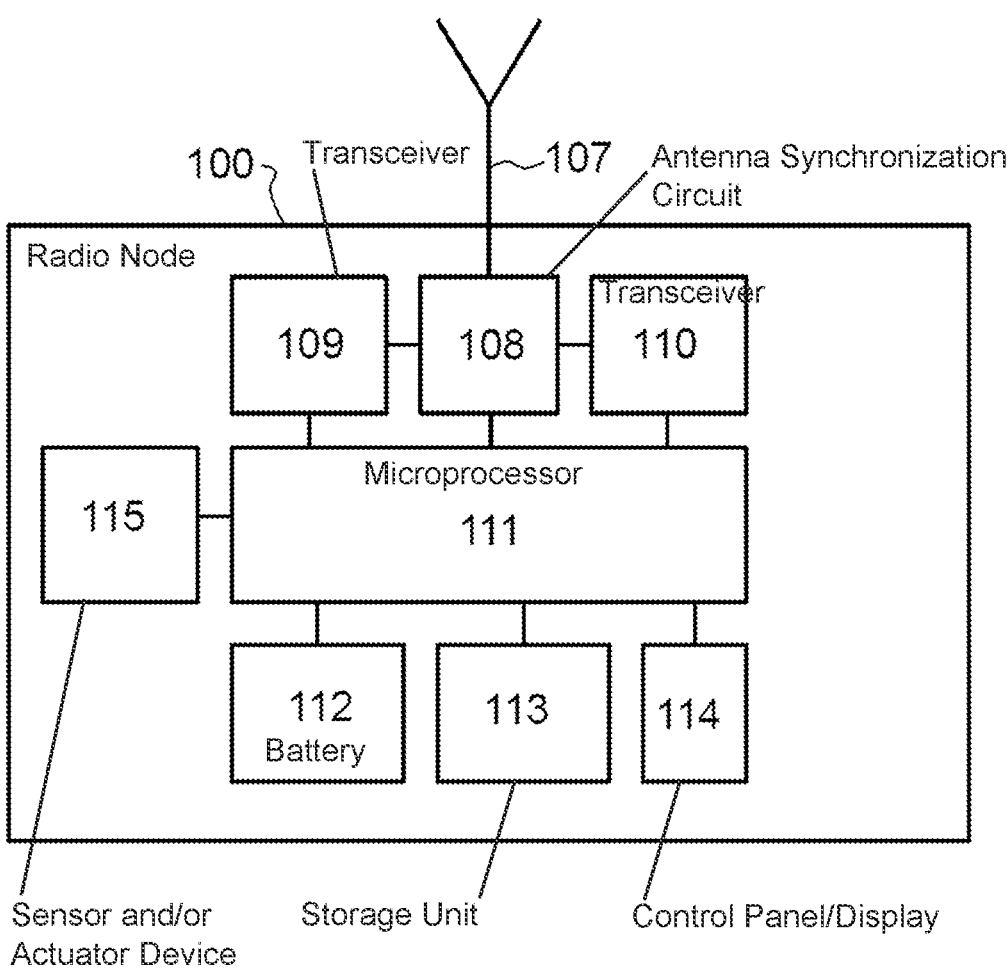
FIG. 2 is a highly simplified schematic block diagram of the functional units of a radio node of the fixed network from FIG. 1.

FIG. 2 shows the functional structure of a radio node 100 of the fixed network 500 from FIG. 1, which is illustrated by way of example and in a highly simplified manner. The radio node 100 has for example a single antenna 107 and two transceivers 109, 110, wherein the transceiver 109 is provided for the first primary communication link PKS1 and the transceiver 110 is provided for the primary communication link PKS2. An antenna synchronization circuit 108 ensures that both transceivers 109, 110 are able to perform only a synchronized access operation to the antenna 107. The radio node 100 furthermore includes a microprocessor 111 having a control and/or supervision circuit, and a storage unit 113. The radio node 100 furthermore has a battery 112, preferably in the form of a so-called long-life battery, preferably with a lifetime of at least 10 years, and a sensor and/or actuator device 115. The radio node 100 may additionally have a control panel/display 114.

Figure 3:
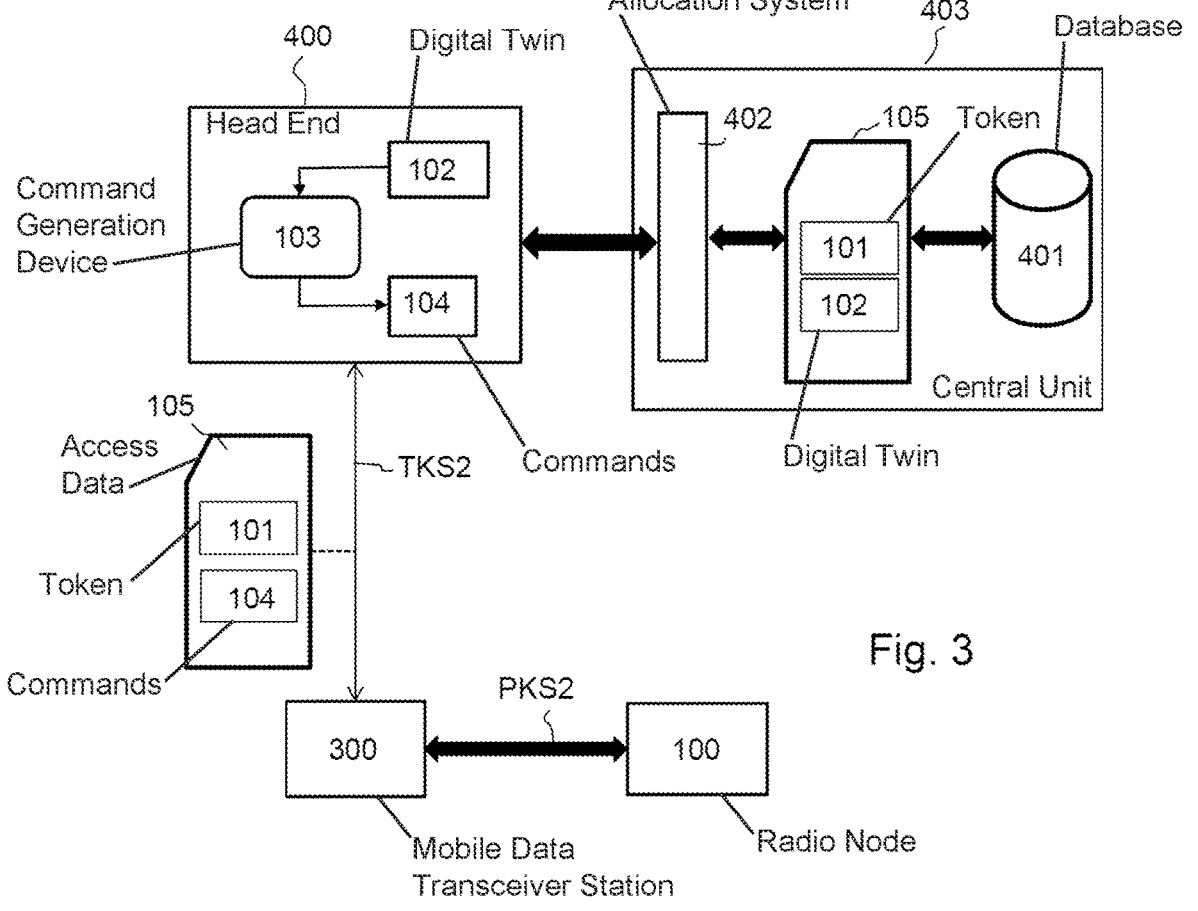
FIG. 3 is a highly simplified schematic block diagram of the structure of the creation of a configuration task from the head end to the mobile data transceiver station for a radio node of the fixed network.

According to the example shown in FIG. 3, the head end 400 is in a bidirectional communication connection with the central unit 403. As an alternative, the central unit 403 may also be integrated into the head end 400. The central unit 403 includes the database 401 in which data in relation to the fixed network 500, including the radio nodes 100 operated there, are stored in a centralized manner.

In order to allow the mobile data transceiver station 300, as an authorized entity, to access a specific radio node 100 through the second primary communication link PKS2, access data 105, which contain a token 101 and a digital twin 102, are extracted from the database 401. The token 101 is an individual token, allocated for a very specific radio node 100, in the form of a digital deposit. The digital twin 102 is a copy or a replica of the attribute data (configuration data) of the radio node 100 in question that are able to be influenced externally.

The request for the relevant data 101 and 102 for the selected radio node 100 from the central unit 403 is made by the head end 400 through an allocation system 402. The access data 105, requested by the allocation system 402, in the form of the token 101 and the digital twin 102 are transmitted to the head end 400. The head end 400 prepares the access data 105 according to the request. As a result of the access data 105 being allocated, all further access operations to the central unit 403 are blocked for this radio node by the head end 400.

In the exemplary embodiment shown in FIG. 3, specific preconceived commands 104 are generated based on the digital twin 102 by a command generation device 103. These are preconceived commands by way of which a desired configuration may be started and carried out after access has been established by the mobile data transceiver station 300 in the radio node 100 in question. The mobile data transceiver station 300 in this case carries out only the preconceived commands for establishing access and for transmitting the access data 105. The access data 105, in the form of the token 101 and the preconceived commands 104, are transmitted from the head end 400 to the mobile data transceiver station 300 over the second tertiary communication link TKS2. The digital twin 102 remains in the head end 400. Since the head end 400 has the digital twin 102, the head end 400 does not need to read the operating data to generate a command. Preconceived commands may thus be generated by the head end 400 without the operating data of the radio node having to be read.

As soon as the mobile data transceiver station 300 comes within range of the selected radio node 100, communication is started and the access operation to the radio node 100 takes place, in which the configuration of the radio node 100 is able to be adapted according to the necessary requirements on the basis of the commands 104 prepared in the head end 400.

Successful configuration is confirmed by the radio node 100, for example through the second primary communication link PKS2 of the mobile data transceiver station 300, in response to which the mobile data transceiver station 300 reports back to the head end 400 and confirms the successful configuration. In connection therewith, the retrieval data 105 are also transmitted back to the head end 400. At the same time, the digital twin 102 remaining in the head end 400 is updated accordingly and written back to the database 401 through the allocation system 402. An updated digital twin 102 is thereby retained in the database 401 for each radio node 100 of the fixed network 500.

Likewise, a token 401 specific to each radio node 100 of the fixed network 500 may be retained in the database 401. As an alternative, an individual token 101 may be created for the radio node 100 in question for each configuration process. Preferably, the token 101 may also be provided with a time-limited validity. This could be important if the token 101 is "lost," that is to say it cannot be transmitted back to the head end 400 from the mobile data transceiver station 300.

After the access data have been received by the head end 400, access to the radio node 100 is released again. If the access data are not received by the head end 400, a release of the access may also be forced, for example, or take place by virtue of the token 101 expiring.

As an alternative, the access data 105 transmitted from the head end 400 may include the digital twin 102 instead of the preconceived commands. In this case, the user is able to configure corresponding commands on the mobile data transceiver station 300 in order to initiate the access operation and the change to the operating data or configuration. Since, in this case, the mobile data transceiver station 300 receives the digital twin 102, it does not need to read the operating data of the radio node in order to generate a command. Commands may thus be generated by the mobile data transceiver station 300 without the operating data of the radio node having to be read. After the operating data or configuration have been changed successfully, the digital twin 102 is updated in the mobile data transceiver station 300 and transmitted back to the head end 400.

Figures 4, 5:
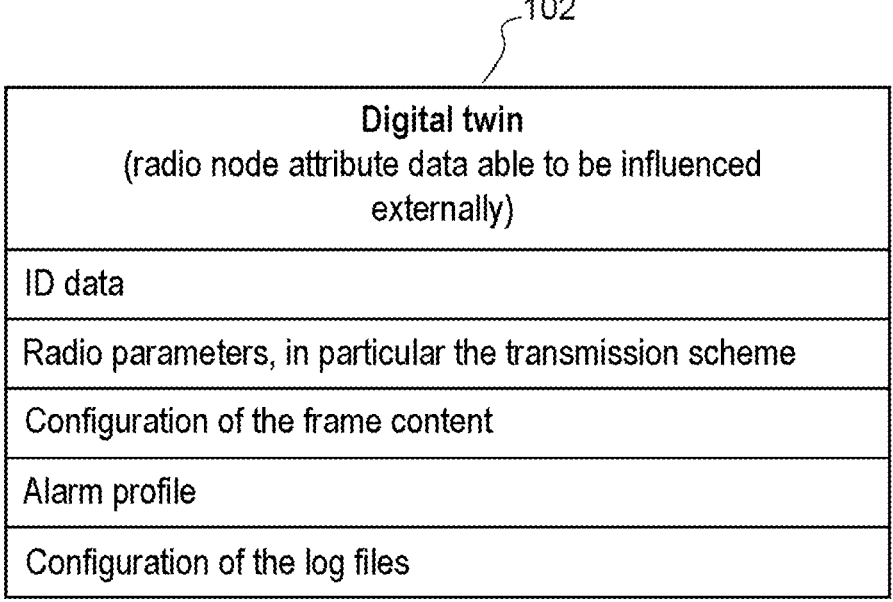
FIG. 4 is a table containing one example of the organization of the retrieval data in the database for configuring a radio node by way of the mobile data transceiver station.
FIG. 5 is a table containing one example of the radio node attribute data contained in the digital twin.

According to FIG. 4, for each radio node 1, 2 to 1.n, an associated token 1, 2 to 1+n and an associated digital twin 1, 2 to 1+n are managed in the database 401.

The digital twin 102 is a replica of the radio node attribute data (operating or configuration data) that are able to be influenced externally. These may include the ID data, the radio parameters (in particular the transmission scheme), the configuration of the frame content, the alarm profile and/or the configuration of the log files or logging.

The token 101 may include an access key of the respective radio node 100 or be formed thereby.

Figure 6:
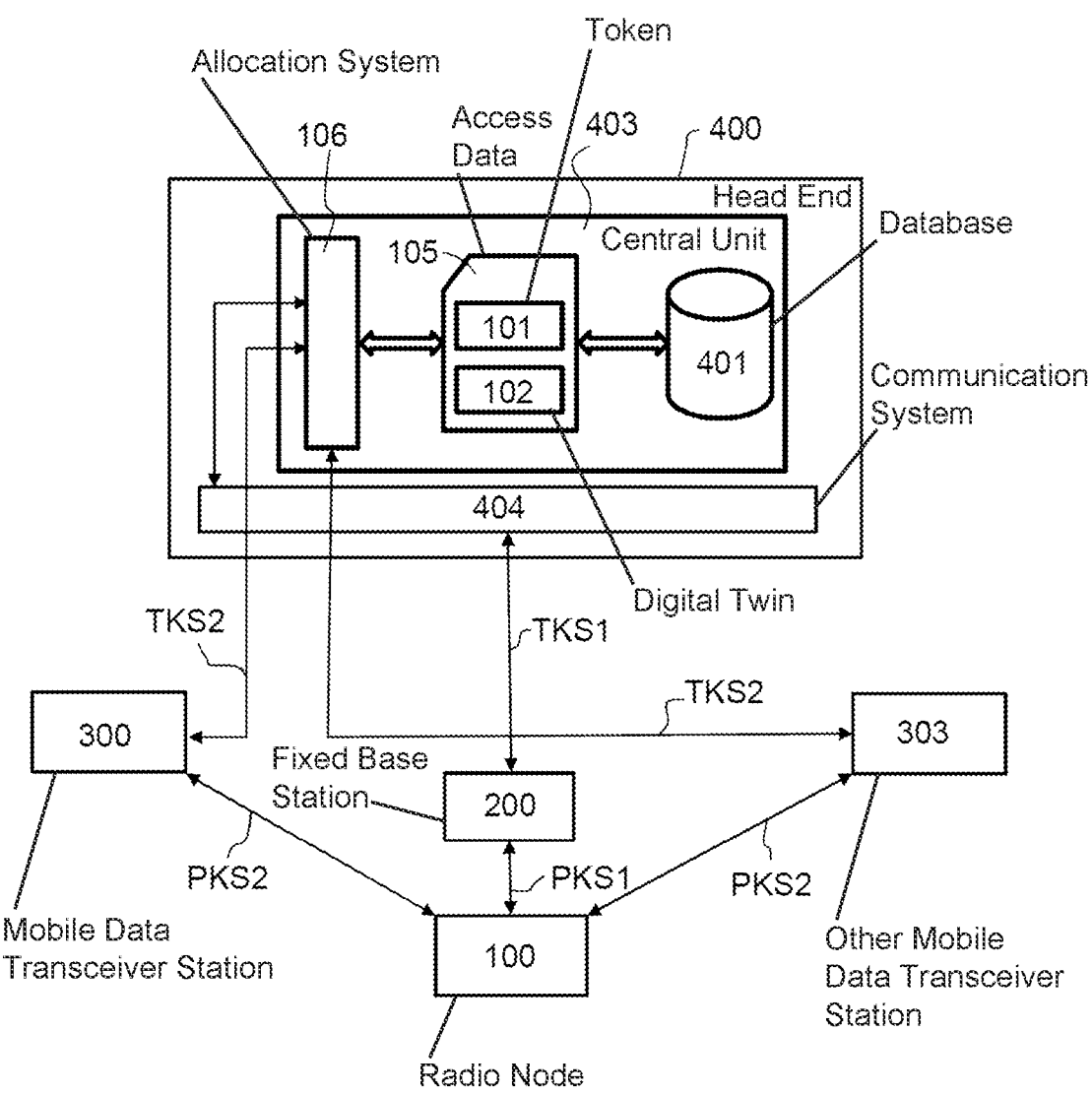
FIG. 6 is a highly simplified schematic block diagram of the communication links in the event of a configuration access operation on a radio node using the mobile data transceiver station in a structure in which the central unit is integrated into the head end.

FIG. 6 shows a highly simplified schematic illustration of the communication links in the event of a configuration access operation on a radio node using the mobile data transceiver station in a structure in which the central unit 403 is integrated into the head end 400. The access data 105 may be transferred in this case from the allocation system 106 of the central unit 403 to the mobile data transceiver station 300 or to another mobile data transceiver station 303 or transmitted through the respective second tertiary communication links TKS2. However, only the mobile data transceiver station, for example the mobile data transceiver station 300, that has actually received the access data 105 may act as an authorized entity. The head end 400 has a communication system 404 for the communication of the head end 400 with the base station 200 of the fixed network 500 and with the respective mobile data transceiver station 300, 303.

The individual steps in the event of a configuration access operation according to the present invention are listed in FIG. 7. In the variant according to FIG. 7, only preconceived commands generated in the head end are transmitted to the mobile data transceiver station together with the token 101, and the digital twin 102 remains in the head end 400. The mobile data transceiver station serves in this case to transmit the preconceived commands. The order of the individual steps shown in FIG. 7 may vary. Individual steps from FIG. 7 may also be combined.

In FIG. 8, on the other hand, the digital twin 102 is transmitted to the mobile data transceiver station together with the token 101. A user is thereby able to define and perform the access operation on the mobile data transceiver station in the field, for example ad hoc, using the digital twin 102. The order of the individual steps shown in FIG. 8 may likewise vary. Individual steps from FIG. 8 may also be combined. In both cases, the changed operating data of the radio node in question are adapted to the digital twin, that is to say the digital twin is updated.

Should return transmission of the token 101 or of the token 101 and the digital twin 102 not be able to be performed, the access data, in the form of the token or the digital twin and the token, may also be forcibly released again on the respective node. To this end, the user receives a warning message and must confirm the forced release or the termination of the transmission. In this case, the digital twin has to be recreated or resynchronized and read by the radio node.

According to one embodiment of the present invention, the token 101 and/or the digital twin 102 of the operating data of the radio node 100 in question may also be used when accessing, for example configuring the radio node 100 in question, through the fixed network 500 or through the base station 200 thereof according to FIG. 1. As long as the token 101 and/or the digital twin 102 of the radio node 100 in question is being used by the fixed network 500, a configuration task is not possible for the mobile system, that is to say the mobile data transceiver station 300, on the radio node 100 in question.

The following is a summary list of reference numerals and the corresponding structure used in the above description of the invention.

LIST OF REFERENCE SIGNS

100 Radio node
101 Token
102 Digital twin
103 Command generation
104 Commands
105 Access data
106 Allocation system
107 Antenna
108 Antenna synchronization circuit
109 First transceiver
110 Second transceiver
111 Microprocessor
112 Battery
113 Storage unit
114 Control panel/display
115 Sensor and/or actuator device
200 Base station
201 WAN
300 Mobile data transceiver station
301 WAN
302 Link
400 Head end
401 Database
402 Allocation system
403 Central unit
404 Communication system
500 Fixed network
PKS1 First primary communication link
PKS2 Second primary communication link
TKS1 First tertiary communication link
TKS2 Second tertiary communication line

The invention claimed is:

1. A method for operating at least one of a radio node or a radio sensor node for recording consumption or a radio actuator node for performing work, in a fixed network including a plurality of radio nodes, the method comprising:
    providing a first primary communication link between a radio node and a base station of the fixed network, through which an access operation is able to be carried out from the base station or through the base station to the radio node;
    providing a second primary communication link between the radio node and a mobile data transceiver station, through which an access operation is able to be carried out from the mobile data transceiver station or through the mobile data transceiver station to the radio node;
    providing a head end in which the plurality of radio nodes are managed;
    providing a tertiary communication link through which the head end is able to communicate with at least one of the base station of the fixed network or the mobile data transceiver station;
    using the mobile data transceiver station or the head end to carrying out an access operation from the mobile data transceiver station or from the head end, through the mobile data transceiver station, to a respective radio node of the plurality of radio nodes of the fixed network by way of access data based on a combination of a token and a digital twin of the operating data of the respective radio node; and for an access operation using the mobile data transceiver station, transmitting the token from the head end to the mobile data transceiver station.

2. The method according to claim 1, which further comprises providing the first and second primary communication links as respective bidirectional communication links, and providing the access operations as configuration access operations.

3. The method according to claim 1, which further comprises providing at least one of a respective token or a respective digital twin in the head end for the respective nodes of the fixed network.

4. The method according to claim 1, which further comprises, after the access operation, transmitting the token or the digital twin and the token back from the accessing mobile data transceiver station to the head end.

5. The method according to claim 1, which further comprises providing the token with a time-limited validity.

6. The method according to claim 1, which further comprises using the head end to assign access to the mobile data transceiver station, or using the mobile data transceiver station to request access from the head end.

7. The method according to claim 6, which further comprises using the head end to assign access to the mobile data transceiver station in a course of a work task.

8. The method according to claim 1, which further comprises blocking the respective radio node from further access operations in the head end as a result of creating the access data.

9. The method according to claim 1, which further comprises forcibly releasing the access data.

10. The method according to claim 1, which further comprises at least one of:
    implementing LoRaWAN as the fixed network, or
    implementing wireless M-bus communication between the radio node and the mobile data transceiver station, or
    carrying out a time window-based data exchange in the fixed network during normal operation.

11. The method according to claim 10, which further comprises automating the time window-based data exchange.

12. A radio node being at least one of a radio sensor node for recording consumption or a radio actuator node for performing work, the radio node comprising:
    a housing;
    a first transceiver for bidirectional communication along a first primary communication link;
    a second transceiver for bidirectional communication along a second primary communication link;
    at least one of a sensor or an actuator device;
    a battery; and
    a microprocessor having an electronic control and regulation device, said electronic control and regulation device being configured to carry out the method according to claim 1.

13. The radio node according to claim 12, wherein said first and second primary communication links are respective bidirectional first and second primary communication links, and said battery is a long-life battery.

14. A method for operating at least one of a radio node or a radio sensor node for recording consumption or a radio actuator node for performing work, in a fixed network including a plurality of radio nodes, the method comprising:
    providing a first primary communication link between a radio node and a base station of the fixed network, through which an access operation is able to be carried out from the base station or through the base station to the radio node;

providing a second primary communication link between the radio node and a mobile data transceiver station, through which an access operation is able to be carried out from the mobile data transceiver station or through the mobile data transceiver station to the radio node;

providing a head end in which the plurality of radio nodes are managed;

providing a tertiary communication link through which the head end is able to communicate with at least one of the base station of the fixed network or the mobile data transceiver station;

using the mobile data transceiver station or the head end to carrying out an access operation from the mobile data transceiver station or from the head end, through the mobile data transceiver station, to a respective radio node of the plurality of radio nodes of the fixed network by way of access data based on a combination of a token and a digital twin of operating data of the respective radio node; and providing or forming the token with an access key of the respective radio node.

15. A method for operating at least one of a radio node or a radio sensor node for recording consumption or a radio actuator node for performing work, in a fixed network including a plurality of radio nodes, the method comprising:

providing a first primary communication link between a radio node and a base station of the fixed network, through which an access operation is able to be carried out from the base station or through the base station to the radio node;

providing a second primary communication link between the radio node and a mobile data transceiver station, through which an access operation is able to be carried out from the mobile data transceiver station or through the mobile data transceiver station to the radio node;

providing a head end in which the plurality of radio nodes are managed;

providing a tertiary communication link through which the head end is able to communicate with at least one of the base station of the fixed network or the mobile data transceiver station;

using the mobile data transceiver station or the head end to carrying out an access operation from the mobile data transceiver station or from the head end, through the mobile data transceiver station, to a respective radio node of the plurality of radio nodes of the fixed network by way of access data based on a combination of a token and a digital twin of operating data of the respective radio node; and providing the digital twin with operating data of the respective radio node being at least one of:

ID data, or radio parameters or a transmission scheme, or a configuration of a frame content, or an alarm profile, or a configuration of log files.

16. A method for operating at least one of a radio node or a radio sensor node for recording consumption or a radio actuator node for performing work, in a fixed network including a plurality of radio nodes, the method comprising:

providing a first primary communication link between a radio node and a base station of the fixed network, through which an access operation is able to be carried out from the base station or through the base station to the radio node;

providing a second primary communication link between the radio node and a mobile data transceiver station, through which an access operation is able to be carried out from the mobile data transceiver station or through the mobile data transceiver station to the radio node;

providing a head end in which the plurality of radio nodes are managed;

providing a tertiary communication link through which the head end is able to communicate with at least one of the base station of the fixed network or the mobile data transceiver station;

using the mobile data transceiver station or the head end to carrying out an access operation from the mobile data transceiver station or from the head end, through the mobile data transceiver station, to a respective radio node of the plurality of radio nodes of the fixed network by way of access data based on a combination of a token and a digital twin of operating data of the respective radio node; and using the mobile data transceiver station, in a course of accessing the operating data of the respective radio node or configuration data of the respective radio node, to synchronize the digital twin according to changes or configuration changes, made to the radio node.

17. A method for operating at least one of a radio node or a radio sensor node for recording consumption or a radio actuator node for performing work, in a fixed network including a plurality of radio nodes, the method comprising:

providing a first primary communication link between a radio node and a base station of the fixed network, through which an access operation is able to be carried out from the base station or through the base station to the radio node;

providing a second primary communication link between the radio node and a mobile data transceiver station, through which an access operation is able to be carried out from the mobile data transceiver station or through the mobile data transceiver station to the radio node;

providing a head end in which the plurality of radio nodes are managed;

providing a tertiary communication link through which the head end is able to communicate with at least one of the base station of the fixed network or the mobile data transceiver station;

using the mobile data transceiver station or the head end to carrying out an access operation from the mobile data transceiver station or from the head end, through the mobile data transceiver station, to a respective radio node of the plurality of radio nodes of the fixed network by way of access data based on a combination of a token and a digital twin of operating data of the respective radio node; and in a course of accessing the respective node, writing only changes to the operating data or a configuration made on the operating data, to the digital twin.

18. A method for operating at least one of a radio node or a radio sensor node for recording consumption or a radio actuator node for performing work, in a fixed network including a plurality of radio nodes, the method comprising:

providing a first primary communication link between a radio node and a base station of the fixed network, through which an access operation is able to be carried out from the base station or through the base station to the radio node;

providing a second primary communication link between the radio node and a mobile data transceiver station, through which an access operation is able to be carried out from the mobile data transceiver station or through the mobile data transceiver station to the radio node;

providing a head end in which the plurality of radio nodes are managed;

providing a tertiary communication link through which the head end is able to communicate with at least one of the base station of the fixed network or the mobile data transceiver station;

using the mobile data transceiver station or the head end to carrying out an access operation from the mobile data transceiver station or from the head end, through the mobile data transceiver station, to a respective radio node of the plurality of radio nodes of the fixed network by way of access data based on a combination of a token and a digital twin of operating data of the respective radio node; and after the access data have been received by the head end, releasing access to the radio node again or, if the access data are not received by the head end, forcing a release of the access.

19. A method for operating at least one of a radio node or a radio sensor node for recording consumption or a radio actuator node for performing work, in a fixed network including a plurality of radio nodes, the method comprising:

providing a first primary communication link between a radio node and a base station of the fixed network, through which an access operation is able to be carried out from the base station or through the base station to the radio node;

providing a second primary communication link between the radio node and a mobile data transceiver station, through which an access operation is able to be carried out from the mobile data transceiver station or through the mobile data transceiver station to the radio node;

providing a head end in which the plurality of radio nodes are managed;

providing a tertiary communication link through which the head end is able to communicate with at least one of the base station of the fixed network or the mobile data transceiver station;

using the mobile data transceiver station or the head end to carrying out an access operation from the mobile data transceiver station or from the head end, through the mobile data transceiver station, to a respective radio node of the plurality of radio nodes of the fixed network by way of access data based on a combination of a token and a digital twin of operating data of the respective radio node;

providing the access data with at least one of preconceived commands or markings in the digital twin in order to control access; and keeping the digital twin in the head end upon providing the preconceived commands.

20. A method for operating at least one of a radio node or a radio sensor node for recording consumption or a radio actuator node for performing work, in a fixed network including a plurality of radio nodes, the method comprising:

providing a first primary communication link between a radio node and a base station of the fixed network, through which an access operation is able to be carried out from the base station or through the base station to the radio node;

providing a second primary communication link between the radio node and a mobile data transceiver station, through which an access operation is able to be carried out from the mobile data transceiver station or through the mobile data transceiver station to the radio node;

providing a head end in which the plurality of radio nodes are managed;

providing a tertiary communication link through which the head end is able to communicate with at least one of the base station of the fixed network or the mobile data transceiver station;

using the mobile data transceiver station or the head end to carrying out an access operation from the mobile data transceiver station or from the head end, through the mobile data transceiver station, to a respective radio node of the plurality of radio nodes of the fixed network by way of access data based on a combination of a token and a digital twin of operating data of the respective radio node;

additionally using at least one of the token or the digital twin of the operating data of the respective radio node when configuring the respective radio node through the fixed network; and as long as at least one of the token or the digital twin of the respective radio node is being used in the fixed network, preventing a configuration task for the mobile data transceiver station.

* * * * *